(12) United States Patent
Hunter et al.

(10) Patent No.: US 6,834,318 B2
(45) Date of Patent: Dec. 21, 2004

(54) BIDIRECTIONAL BUS REPEATER FOR COMMUNICATIONS ON A CHIP

(75) Inventors: Michael James Hunter, Mertztown, PA (US); Hyun Lee, Ladera Ranch, CA (US); David Wayne Potter, Allentown, PA (US)

(73) Assignee: Agere Systems Inc., Allentown, PA (US)

( * ) Notice: Subject to any disclaimer, the term of this patent is extended or adjusted under 35 U.S.C. 154(b) by 416 days.

(21) Appl. No.: 09/785,653

(22) Filed: Feb. 16, 2001

(65) Prior Publication Data

US 2004/0225793 A1 Nov. 11, 2004

(51) Int. Cl.[7] .................... G06F 13/00; H03K 19/0175
(52) U.S. Cl. ..................... 710/110; 710/31; 326/86; 326/90
(58) Field of Search .................. 710/31, 110, 305, 710/310; 326/17, 30, 33, 56, 62, 80, 82, 86, 90, 112

(56) References Cited

U.S. PATENT DOCUMENTS

| | | | | |
|---|---|---|---|---|
| 5,214,330 A | * | 5/1993 | Okazaki ..................... | 326/90 |
| 5,736,870 A | * | 4/1998 | Greason et al. ............ | 326/86 |
| 6,448,810 B1 | * | 9/2002 | Nomura ...................... | 326/82 |
| 6,522,169 B2 | * | 2/2003 | Anderson et al. ........... | 326/82 |
| 6,567,871 B2 | * | 5/2003 | Koh et al. .................. | 710/110 |

* cited by examiner

Primary Examiner—Khanh Dang

(57) ABSTRACT

A bidirectional bus repeater is disclosed that connects individual segments of a bidirectional bus. The exemplary bidirectional bus repeater consists of a direction control block and a buffer block. The buffer block contains one pair of buffers for each bus bit and an extra pair associated with the indicator lines. Indicator lines are used by the direction control block based on activity on the bus to generate control signals (control-A and control-B) that control the state of the tri-state buffers. In an exemplary embodiment, each node must toggle the indicator line whenever the node drives the bus. When the bus is inactive, the control-A and control-B signals generated by the direction control block are both inactive because the voltages on both sides of the bidirectional bus repeater are the same. When the direction control block detects a change of voltage on the indicator line associated with one side of the bus (e.g., indicator-A associated with bus-A), the corresponding tri-state buffers are enabled. Thereafter, the opposite bus segment (bus-B) is driven by the repeater buffers, until the bus segment bus-B reaches the same logic level as the bus segment bus-A. The logic level on indicator-B also changes to the same logic level as indicator-A. Eventually, both segments of the bus wire and the indicator wires connected to the bidirectional bus repeater circuit are equal and the DC turns off the a control signal A (cntl-A).

13 Claims, 4 Drawing Sheets

310

BIDIRECTIONAL BUS REPEATER FOR COMMUNICATIONS ON A CHIP

CROSS REFERENCE TO RELATED APPLICATIONS

The present invention is related to U.S. patent application Ser. No. 09/785,604 entitled "Method and Apparatus for Distributing a Self-Synchronized Clock to Nodes on a Chip," U.S. patent application Ser. No. 09/788,582 entitled "Method and Apparatus for Transferring Multi-Source/Multi-Sink Control Signals Using a Differential Signaling Technique," U.S. Pat. No. 6,754,748 B2 entitled "Method and Apparatus for Distributing Multi-Source/Multi-Sink Control Signals Among Nodes on a Chip," and U.S. patent application Ser. No. 09/785,592 entitled "On-Chip Method and Apparatus for Transmission of Multiple Bits Using Quantized Voltage Levels," each filed contemporaneously herewith, assigned to the assignee of the present invention and incorporated by reference herein.

FIELD OF THE INVENTION

The present invention relates generally to communications on a single chip, and more particularly, to a bidirectional bus repeater for communicating on a single chip.

BACKGROUND OF THE INVENTION

Address and data busses provide data paths that are shared by a number of data processing devices, such as memory devices, micro-controllers, microprocessors, digital signal processors (DSPs) and peripheral devices. Busses are typically formed on printed circuit boards (PCBs) and interconnect the various devices mounted on the PCB. The busses may also extend to connectors in order to allow external devices to be coupled to the bus.

Recently, integrated circuit (IC) manufacturers have begun producing single chips containing multiple device cores, such as multiple memory devices, micro-controllers, microprocessors and digital signal processors (DSPs), that were traditionally mounted on a PCB and interconnected by one or more busses on the PCB. Such a single chip is commonly referred to as a system-on-a-chip (SoC). SoCs incorporate one or more busses to provide data paths to interconnect the multiple core devices on the chip, often referred to as "nodes." The busses on SoCs, however, comprise conductor traces on the chip and thus tend to be much shorter in length and less sensitive to noise than PC3 busses.

As SoCs grow in size and complexity, the requirement of communicating control and data signals between various nodes or devices on the SoC becomes more difficult. To meet customer expectations for increasing performance, the busses for communicating address and data signals are required to transfer data at the speed of the system clock. Most currently available SoCs provide high-speed unidirectional buses with cross switches or multiplexers for connecting different nodes, since a unidirectional bus usually provides a faster bus transfer rate. While the unidirectional buses provide the required transfer rates, they require additional control signals for the cross switches, as well as additional area for routing the multiplicity of buses, which is not practical for SoC applications. Furthermore, the bus architecture requires a clear distinction of master nodes, such as processors, from slave nodes, such as memories. This distinction prevents any direct data transfer from one master device to another master device or a transfer from one slave device to another slave device. Thus, additional operation cycles are required to perform a direct memory access (DMA) operation.

A bidirectional bus could overcome some of the identified disadvantages of a unidirectional bus. One of the main problems associated with a bidirectional bus, however, is that there has been no clear way of preventing the dispersion of a signal waveform on the bus. Generally, for a unidirectional bus, a repeater reshapes the signal waveform and also reduces the resistive-capacitive (RC) delays on the bus by segmenting the bus wire with a number of repeaters inserted at strategic locations on the bus. This approach has not been possible for a bidirectional bus, however, since, by nature, a repeater is a unidirectional element. Thus, any node connected to a bus on the output side of a repeater can only drive the bus with an unacceptable delay (or rise/fall time), if at all.

A need therefore exists for a high-speed bidirectional bus for use in integrated circuits, such as SoC devices or printed circuit boards (PCBs). A further need exists for a bidirectional repeater circuit that can reduce dispersion of a signal waveform, while also reducing the RC delay on the bus by segmenting long bus wires.

SUMMARY OF THE INVENTION

Generally, a bidirectional bus repeater is disclosed that connects individual segments of a bidirectional bus. The exemplary bidirectional bus repeater consists of a direction control block and a buffer block. The buffer block contains one pair of buffers for each bus bit and an extra pair associated with the indicator lines. Indicator lines are used by the direction control block based on activity on the bus to generate control signals (control-A and control-B) that control the state of the tri-state buffers. In an exemplary embodiment, each node must toggle the indicator line whenever the node drives the bus.

When the bus is inactive, the control-A and control-B signals generated by the direction control block are both inactive because the voltages on both sides of the bidirectional bus repeater are the same. When the direction control block detects a change of voltage on the indicator line associated with one side of the bus (e.g., indicator-A associated with bus-A), the corresponding tri-state buffers are enabled. Thereafter, the opposite bus segment (bus-B) is driven by the repeater buffers, until the bus segment bus-B reaches the same logic level as the bus segment bus-A. The logic level on indicator-B also changes to the same logic level as indicator-A. Eventually, both segments of the bus wire and the indicator wires connected to the bidirectional bus repeater circuit are equal and the DC turns off the control signal A (cntl-A).

The bidirectional bus repeater of the present invention is guided by the bus signals themselves and thus does not require any special control signals or clock signals to operate the bidirectional bus. Thus, an SoC employing the present invention can be truly scalable since any number of modules can be added to the bidirectional bus without reconfiguring the bus structure.

A more complete understanding of the present invention, as well as further features and advantages of the present invention, will be obtained by reference to the following detailed description and drawings.

DETAILED DESCRIPTION

Figure 1:
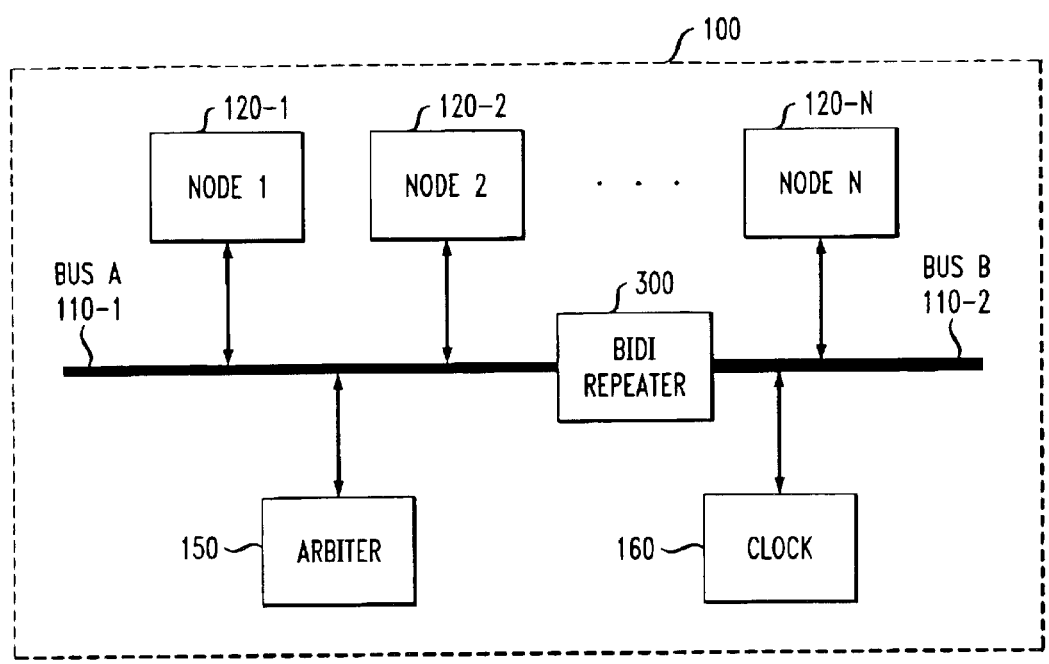
FIG. 1 is a schematic block diagram illustrating a conventional SoC where the present invention can operate.

FIG. 1 is a schematic block diagram illustrating an exemplary SoC 100 where the present invention can operate. The exemplary SoC 100 includes a bidirectional bus 110 that interconnects various nodes 120-1 through 120-N (multiple core devices), collectively referred to as nodes 120, on the chip 100. The bidirectional bus 110 has a first segment 110-1 and a second segment 110-2 interconnected by a bidirectional bus repeater circuit 300 in accordance with the present invention, discussed below in conjunction with FIG. 3. The nodes 120 may be embodied, for example, as memory devices, micro-controllers, microprocessors and digital signal processors (DSPs).

When an SoC 100 includes multiple nodes 120 communicating over a common bus 110, an Arbiter 150 is often used to determine which node 120 should actively drive the bus 110 at a particular time. Multi-source/multi-sink control signals, such as acknowledgement (ACK), data-valid, interrupt and error signals, are often employed to control communications on the SoC bus 110. All of the various nodes 120 and the Arbiter 150 typically operate synchronously with respect to a common clock 160.

Figure 2:
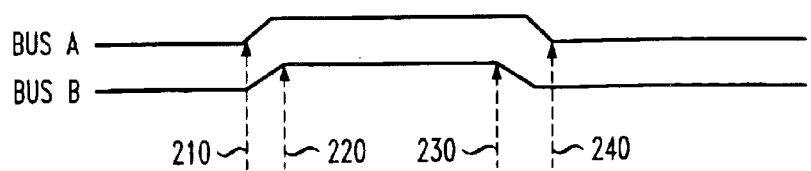
FIG. 2 illustrates the timing of each node indicated in FIG. 1.

FIG. 2 illustrates the timing of each node indicated in FIG. 1. As shown in FIG. 2, at a time instant 210, a change is detected on bus A 110-1 by the bidirectional bus repeater circuit 300. As discussed further below, the bidirectional bus repeater circuit 300 will respond to the detected change by driving bus-B 110-2. In other words, the voltage change sensed on bus-A will be applied to bus-B. At an instant 220, bus-B becomes equal to bus-A and the bidirectional bus repeater circuit 300 shuts off. The bus 110 is then inactive until an instant 230, when a change on bus-B is detected by the bidirectional bus repeater circuit 300 and bus-A is driven by the bidirectional bus repeater circuit 300. At an instant 240, bus-A becomes equal to bus-B and the bidirectional bus repeater circuit 300 shuts off.

Figure 3:
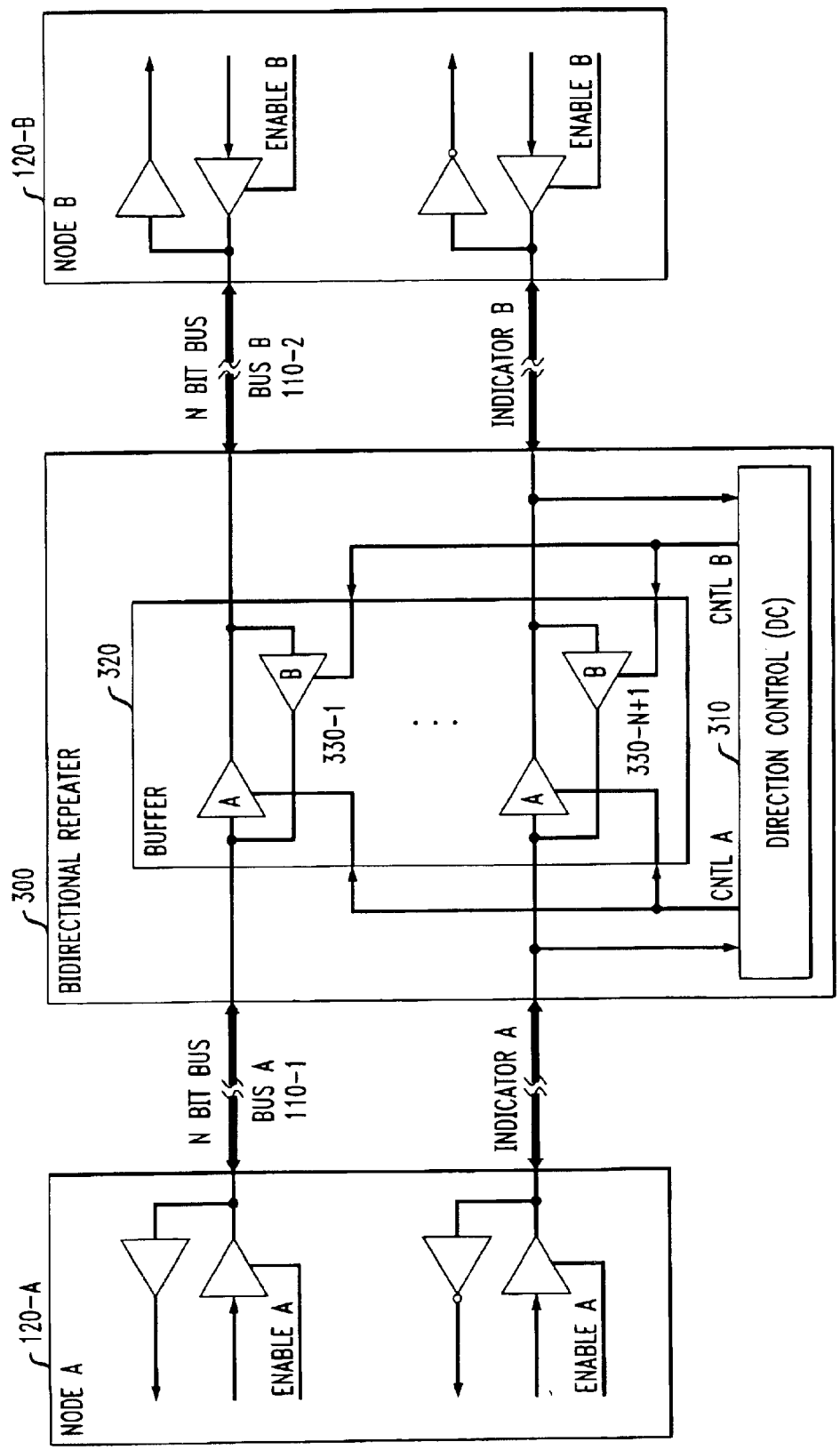
FIG. 3 is a schematic block diagram illustrating the bidirectional bus repeater circuit of FIG. 1 in further detail.

FIG. 3 is a schematic block diagram illustrating the bidirectional bus repeater circuit 300 of FIG. 1 in further detail. As shown in FIG. 3, the bidirectional bus repeater circuit 300 consists of two functional blocks, namely, a direction control block 310 and a buffer block 320. The buffer block contains N+1 pairs of tri-state buffers 330-1 through 330-N+1 (collectively, buffers 330) connected in a loop back fashion, where N is the number of data (address) bits on the bus 110. Thus, there is one pair of buffers 330 for each bus bit and an extra pair associated with the indicator lines. Indicator lines are used by the direction control block 310 to decide which tri-state buffers 330 to turn on. All nodes 120 connected to this repeater 300 are required to toggle this indicator line whenever the node drives the bus 110.

Figure 4:
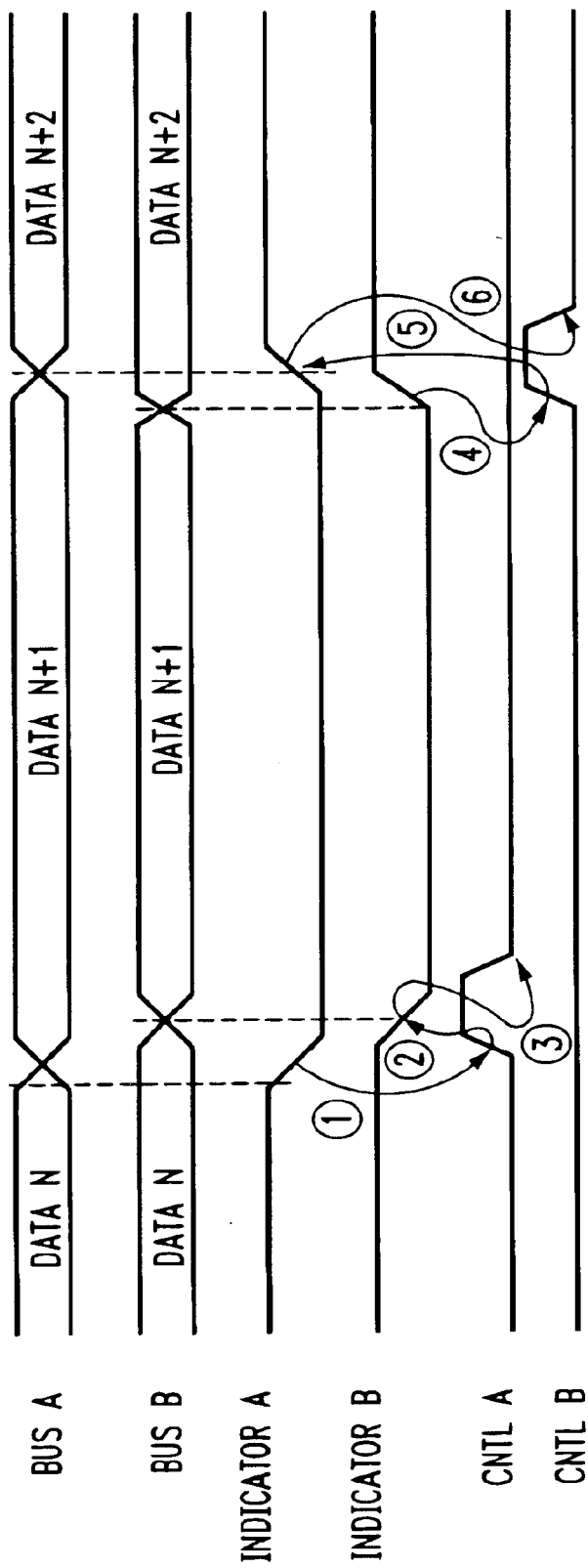
FIG. 4 is a detailed timing diagram illustrating the operation of the bidirectional bus repeater circuit of FIG. 3.

FIG. 4 is a detailed timing diagram illustrating the operation of the bidirectional bus repeater circuit 300 of FIG. 3. As shown in FIG. 4, prior to event 1, the control-A and control-B signals generated by the direction control block 310 are both inactive because the voltages on both sides of the bidirectional bus repeater circuit 300 are the same. During event 1, the direction control block 310 detects a change of voltage on indicator-A from node 120-A, thus enabling the tri-state buffers A (330) in FIG. 3.

During event 2, the bus segment bus-B 110-2 is driven by the repeater buffers A (330), until event 3. During event 3, the bus segment bus-B 110-2 reaches the same logic level as the bus segment bus-A 110-1. The logic level on indicator-B also changes to the same logic level as indicator-A. Following event 3, both segments of the bus wire 110-1 and 110-2 and the indicator wires connected to the bidirectional bus repeater circuit 300 are equal and the DC turns off the control signal A (cntl-A). Events 4 through 6 occur in a reverse order of the events 1 through 3.

Figure 5:
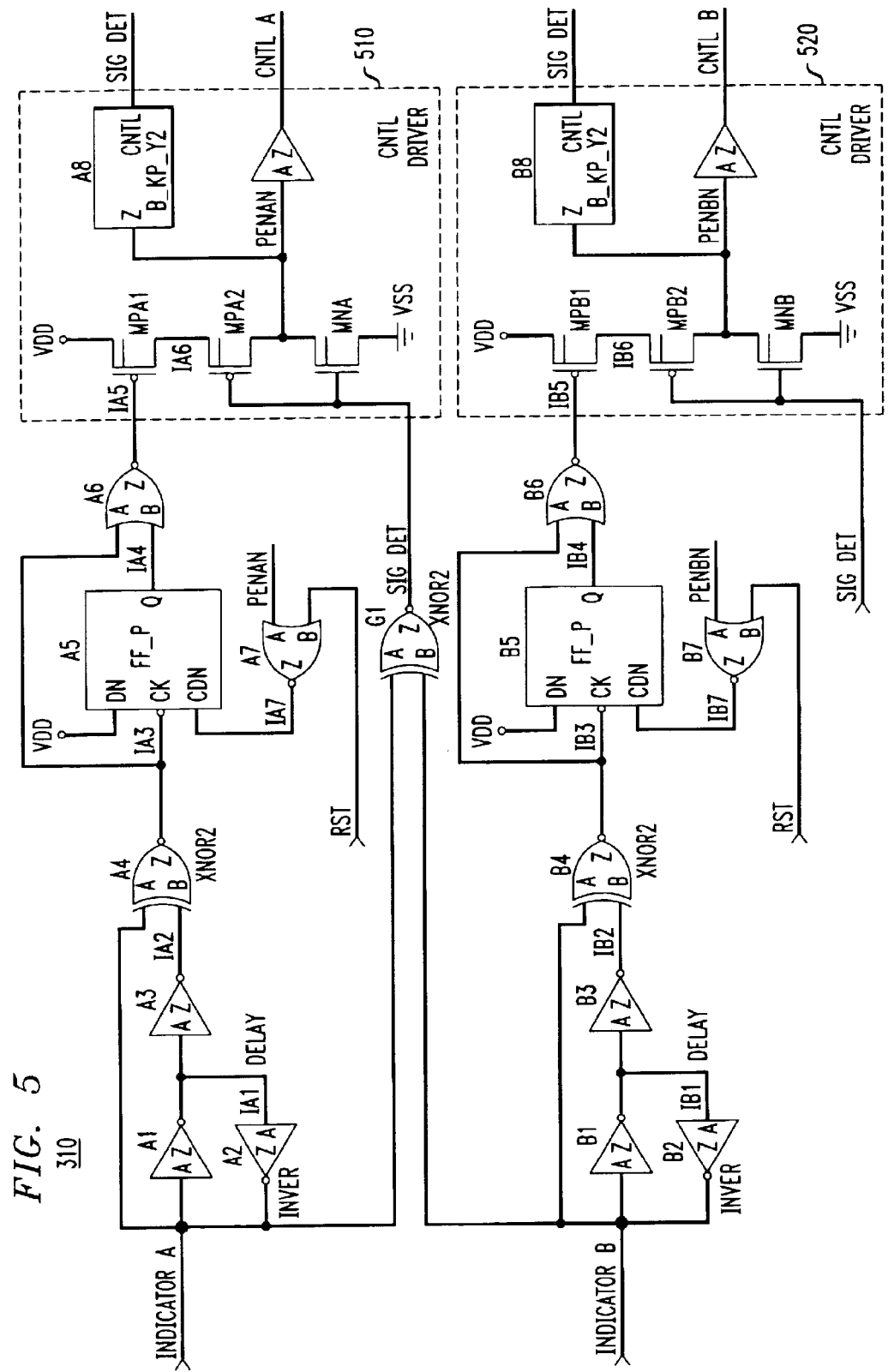
FIG. 5 is a schematic block diagram illustrating an exemplary implementation of the direction control block of FIG. 3 in further detail.

FIG. 5 is a schematic block diagram illustrating an exemplary implementation of the direction control block 310 of FIG. 3 in further detail. As shown in FIG. 5, the direction control block 310 includes a first control driver 510 that generates the control signal (cntl-A) that enables the tri-state buffers A (330) in FIG. 3, and a second control driver 520 that generates the control signal (cntl-B) that enables the tri-state buffers B (330) in FIG. 3.

Referring to the same events discussed above in conjunction with FIG. 4, prior to event 1, both indicator-A and indicator-B are at the same logic level and an exclusive-nor gate G1 in FIG. 5 drives the signal SIG-DET high, which in turn shuts off the transistors MPA2 and MPB2, and turns on the transistors MNA and MNB in the control drivers 510, 520. Thus, both cntl-A and cntl-B are low and the tri-state buffers A and B (330) are both off. During event 1, a change in indicator-A produces a disparity in the logic levels between indicator-A and indicator-B. This difference in logic levels causes SIG-DET to become active (low) which in turn causes the transistors MNA and MNB to shut off, and MPA2 and MPB2 to be on. SIG-DET stays active until indicator-B becomes the same logic level as indicator-A. The change in indicator-A also produces a clock pulse for the flip-flop A5 that causes MPA1 to turn on. Then, the control node CNTL-A becomes active (high) because MPA1 and MPA2 are on and MNA is off.

During event 2, the active cntl-A signal turns on the tri-state buffers A (330) and the bus segment bus-B 110-2 and indicator-B are driven with the logic values on bus-A and indicator-A. During event 2, cntl-B is not active because the level on indicator-B does not change.

During event 3, the bus segment bus-B 110-2 and indicator-B become the same logic levels as the bus segment bus-A and indicator-A, thereby causing SIG-DET to be inactive (high) and drives cntl-A to low. Following event 3, both segments of the bus wire 110-1 and 110-2 and the indicator wires connected to the bidirectional bus repeater circuit 300 are equal and both cntl-A and cntl-B are inactive until the next event. Since the time delay from indicator-A (B) to cntl-A(B) directly impacts the bus delay time, the direction control block 310 should aim to minimize the time delay between these two signals.

The bidirectional bus repeater circuit 300 of the present invention is guided by the bus signals themselves and thus does not require any special control signals to operate the bidirectional bus 110. Thus, an SoC employing the present invention can be truly scalable since any number of modules can be added to the bidirectional bus 110 without reconfiguring the bus structure. When the bus RC delays increase due to lengthening the bus, extra bidirectional bus repeater circuits 300 can be inserted to reduce the RC delay. Thus, a large number of nodes 120 can be attached to the bidirectional bus 110 while maintaining high-speed operation.

It is to be understood that the embodiments and variations shown and described herein are merely illustrative of the principles of this invention and that various modifications may be implemented by those skilled in the art without departing from the scope and spirit of the invention.

We claim:

1. A bidirectional bus repeater circuit, comprising:
   a connector to a fist segment of a bidirectional bus;
   a connector to a second segment of a bidirectional bus; and
   a pair of buffers for each bit on said bidirectional bus, each buffer in said pair transferring data in a given direction between said first segment and said second segment of said bidirectional bus; and
   a pair of indicator lines, wherein a single voltage change on one of said indicator lines causes one or more of said pair of buffers to transfer data in a given direction for a finite period of time based on a time required for the second of said bus segments to reach a same logic level as the first of said bus segments.

2. The repeater of claim 1, further comprising an additional pair of buffers associated with said pair of indicator lines controlling said direction of said bidirectional bus.

3. The repeater of claim 1, further comprising a direction control block that controls said direction of said bidirectional bus based on activity on one of said indicator lines associated with said bidirectional bus.

4. The repeater of claim 3, wherein a given node connected to said bidirectional bus must toggle one of said pair of indicator lines in order to drive said bidirectional bus.

5. The repeater of claim 1, wherein one of said pair of indicator lines continues to enable said corresponding buffers until the second of said bus segments reaches the same logic level as the first of said bus segments.

6. A bidirectional bus, comprising:
   a first segment connected to one or more nodes;
   a second segment connected to one or more nodes;
   a bidirectional bus repeater having a pair of buffers for each bit on said bidirectional bus, each buffer in said pair transferring data in a given direction between said first segment and said second segment of said bidirectional bus; and
   to a pair of indicator signals, wherein a single voltage change on one of said indicator signals causes one or more of said pair of buffers to transfer data in a given direction for a finite period of time based on a time required for the second of said bus segments to reach a same logic level as the first of said bus segments.

7. The bidirectional bus of claim 6, wherein said bidirectional bus repeater further comprises an additional pair of buffers associated with said pair of indicator signals controlling said direction of said bidirectional bus.

8. The bidirectional bus of claim 6, wherein said bidirectional bus repeater further comprises a direction control block that controls said direction of said bidirectional bus based on activity on said pair of indicator signals associated with said bidirectional bus.

9. The bidirectional bus of claim 8, wherein a given node connected to said bidirectional bus must toggle one of said indicator signals in order to drive said bidirectional bus.

10. A method for repeating a signal on a bidirectional bus, comprising the steps of:
    connecting two segments of said bidirectional bus;
    providing a pair of buffers for each bit on said bidirectional bus; and
    transferring a bit of data in a given direction through one of said pair of buffers based on pair of indicator signals, wherein a single voltage change on one of said indicator signals causes one or more of said pair of buffers to transfer data in a given direction for a finite period of time based on a time required for the second of said bus segments to reach a same logic level as the first of said bus segments.

11. The method of claim 10, wherein said bidirectional bus comprises an additional pair of buffers associated with said pair of indicator signals controlling said direction of said bidirectional bus.

12. The method of claim 10, wherein a direction control block controls said direction of said bidirectional bus based on activity on said pair of indicator signals associated with said bidirectional bus.

13. The method of claim 10, wherein a given node connected to said bidirectional bus must toggle one of said pair of indicator signals in order to drive said bidirectional bus.

* * * * *

UNITED STATES PATENT AND TRADEMARK OFFICE
CERTIFICATE OF CORRECTION

PATENT NO. : 6,834,318 B2
DATED : December 21, 2004
INVENTOR(S) : Hunter et al.

It is certified that error appears in the above-identified patent and that said Letters Patent is hereby corrected as shown below:

Column 5,
Line 10, delete "and".
Line 45, before "a pair" delete "to".

Signed and Sealed this

Sixth Day of September, 2005

JON W. DUDAS
*Director of the United States Patent and Trademark Office*